United States Patent
Bernard et al.

(10) Patent No.: US 8,023,820 B2
(45) Date of Patent: Sep. 20, 2011

(54) SYSTEMS, APPARATUS, METHODS AND COMPUTER PROGRAM PRODUCTS FOR DOWNLOADING AND MAINTAINING IP STREAM WHITELISTS ON OPTICAL NETWORK TERMINALS

(75) Inventors: Marc R. Bernard, Miramar, FL (US); Edward J. Szczebak, Frisco, TX (US)

(73) Assignee: Tellabs Vienna, Inc., Naperville, IL (US)

( * ) Notice: Subject to any disclaimer, the term of this patent is extended or adjusted under 35 U.S.C. 154(b) by 869 days.

(21) Appl. No.: 12/013,797

(22) Filed: Jan. 14, 2008

(65) Prior Publication Data
US 2009/0180777 A1    Jul. 16, 2009

(51) Int. Cl.
*H04J 14/00* (2006.01)

(52) U.S. Cl. .............................. 398/66; 398/70; 398/71

(58) Field of Classification Search ................. 398/66, 398/67, 68, 69, 70, 71, 72, 58
See application file for complete search history.

(56) References Cited

U.S. PATENT DOCUMENTS

| | | | |
|---|---|---|---|
| 7,664,019 B2 * | 2/2010 | Boyd et al. ............... | 370/230 |
| 2002/0131101 A1 * | 9/2002 | Ohira et al. ............... | 359/110 |
| 2005/0278620 A1 * | 12/2005 | Baldwin et al. ............ | 715/513 |
| 2007/0019955 A1 * | 1/2007 | Mitra et al. ............... | 398/66 |

* cited by examiner

*Primary Examiner* — M. R Sedighian
(74) *Attorney, Agent, or Firm* — Fitzpatrick, Cella, Harper & Scinto (57) ABSTRACT

Systems, apparatus, methods and computer program products are provided for downloading a whitelist onto a passive optical network including a passive optical network and a management interface communicatively coupled to the passive optical network and configured to provision the whitelist. An optical line terminal also on the passive optical network includes a passive optical network card operable to broadcast the whitelist to optical network terminals which are configured to receive and enforce the whitelist.

20 Claims, 7 Drawing Sheets

SYSTEMS, APPARATUS, METHODS AND COMPUTER PROGRAM PRODUCTS FOR DOWNLOADING AND MAINTAINING IP STREAM WHITELISTS ON OPTICAL NETWORK TERMINALS

BACKGROUND

1. Field

Example aspects of the present invention generally relate to managing optical network components, and more particularly to configuring and maintaining whitelists on a range of optical network terminals (ONTs) within a passive optical network (PON).

2. Related Art

A whitelist is a list of accepted items in a set, which in the PON environment can be used, for example, to provide predefined levels of service associated with an ONT. The list is inclusionary, confirming that the item being analyzed or processed is acceptable. In contrast to a whitelist, a blacklist is a list of items that are not acceptable.

One example of an accepted whitelist item used in a PON environment is an IP address. The IP address can be chose to correspond, for example, to a channel a customer is permitted to view. On a larger scale, a sequence of IP address entries in the whitelist can be received at the ONTs to provide a list of channels a customer has subscribed to. There can be hundreds, even thousands of entries required for each ONT. Typical requirements require 5000 entries per ONT but depending on the types of ONTs or applications, this number can go well beyond this value. Other simple or sophisticated entries can be listed in a whitelist. Supporting and maintaining whitelists on typical distributed PON architectures requires management systems and OLTs to manage provisioning, maintenance and updates of whitelists on each individual ONT in the system.

BRIEF DESCRIPTION

Features and advantages, as well as the structure and operation, of various example embodiments of the present invention are described in detail below with reference to the accompanying drawings.

In one embodiment systems, apparatus, methods and computer program products are provided for downloading a whitelist onto a passive optical network including a passive optical network and a management interface communicatively coupled to the passive optical network and configured to provision the whitelist. An optical line terminal also on the passive optical network includes a passive optical network card operable to broadcast the whitelist to optical network terminals which are configured to receive and enforce the whitelist.

BRIEF DESCRIPTION OF THE DRAWINGS

The features and advantages of the example embodiments presented herein will become more apparent from the detailed description set forth below when taken in conjunction with the drawings.

DETAILED DESCRIPTION

The example embodiments described herein meet the above-identified needs by providing systems, apparatus, methods and computer program products for downloading and maintaining IP stream whitelists on ONTs, which are now described herein in terms of an example passive optical network (PON). This description is not intended to limit the application of the example embodiments presented herein. In fact, after reading the following description, it will be apparent to one skilled in the relevant art(s) how to implement the following example embodiments in alternative embodiments involving whitelist support.

Figure 1:
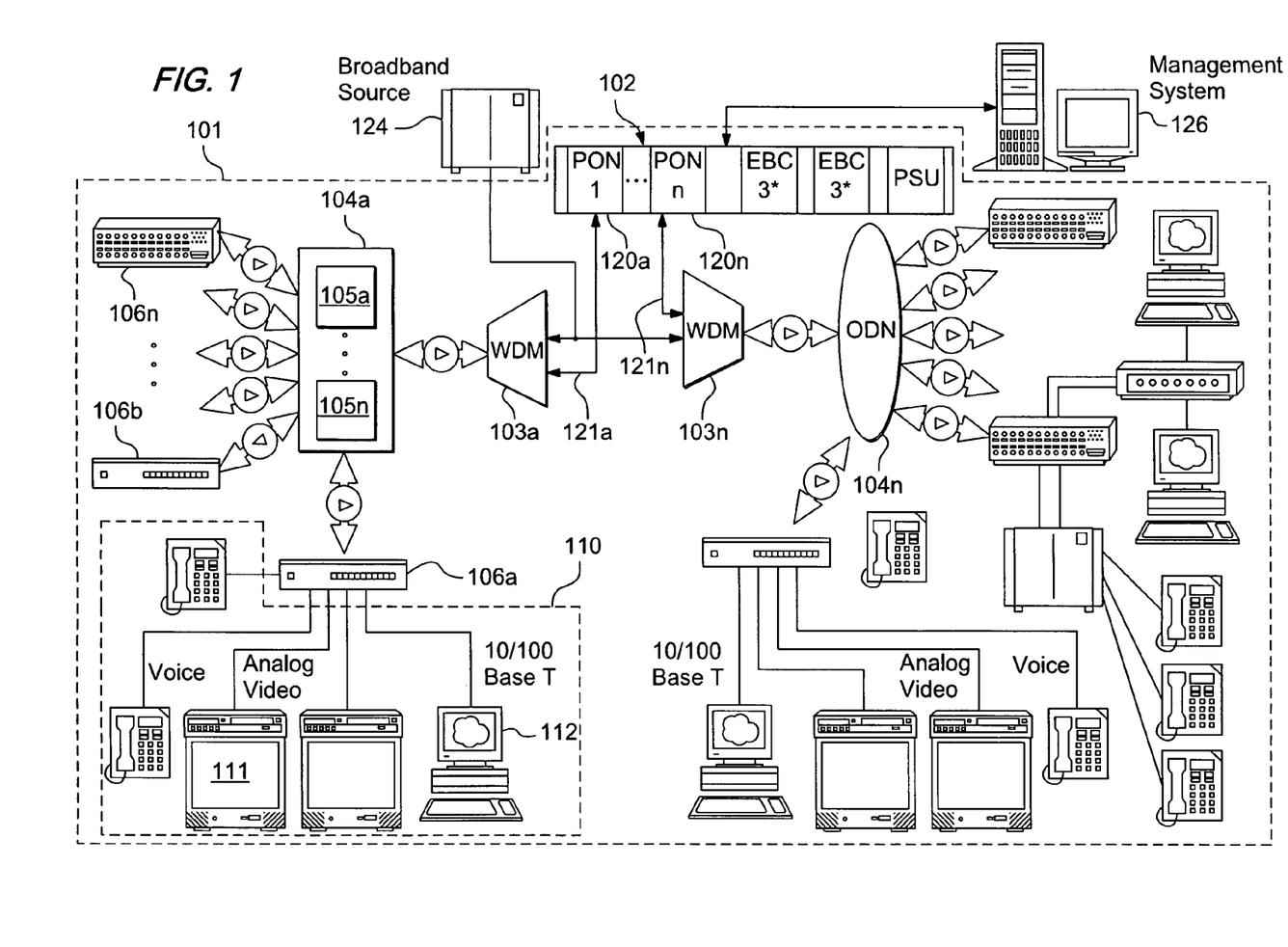
FIG. 1 illustrates an example passive optical network (PON) in which optical network terminals (ONT) provide video, voice and data services to subscribers.

FIG. 1 is a network diagram of an exemplary passive optical network (PON) 101. Generally, PON 101 is made up of fiber optic cabling, passive splitters and couplers that distribute an optical signal through a branched tree topology referred to as an optical distribution network (ODN). Each fiber segment is terminated at a connector to make a connection to devices at a customer's premises. The PON 101 includes an optical line terminal (OLT) 102, wavelength division multiplexers (WDNs) 103a, . . . , 103n, optical distribution network (ODN) devices 104a, . . . , 104n, ODN device splitters (e.g., 105a, . . . , 105n associated with ODN device 104a), optical network terminals (ONTs) (e.g., 106a, 106b, . . . , 106n corresponding to ODN device splitters 105a, . . . , 105n), and customer premises equipment (e.g., 110). OLT 102 includes PON cards 120a, . . . , 120n, each of which provides an optical feed (121a, . . . , 121n) to ODN devices 104a, . . . , 104n. An optical feed 121a, for example, is distributed through a corresponding ODN device 104a by separate ODN device splitters 105a, . . . , 105n to respective ONTs 106a, 106b, . . . , 106n in order to provide communications to and from customer premises equipment 110.

The PON 101 may be deployed for fiber-to-the-business (FTTB), fiber-to-the-curb (FTTC), and fiber-to-the-home (FTTH) applications. The optical fibers 121a, . . . , 121n in PON 101 may operate at bandwidths such as 155 Mb/sec, 622 Mb/sec, 1.25 Gb/sec, 2.5 Gb/sec or any other desired bandwidth implementations. The PON 101 may incorporate asynchronous transfer mode (ATM) communications, broadband services such as Ethernet access and video distribution, Ethernet point-to-multipoint topologies, and native communications of data and time division multiplex (TDM) formats. Customer premises equipment (e.g., 110) that can receive and provide communications in the PON 101 may include standard telephones e.g., Public Switched Telephone Network (PSTN) and cellular, Internet Protocol (IP) telephones, Ethernet units, video devices (e.g., 111), computer terminals (e.g., 112), digital subscriber line connections, cable modems, wireless access, as well as any other conventional device.

A PON 101 includes one or more different types of ONTs (e.g., 106a, 106b, . . . , 106n). Each ONT 106a, 106b, . . . , 106n, for example, communicates with an ODN device 104a through associated ODN device splitters 105a, . . . , 105n. Each ODN device 104a, . . . , 104n, in turn, communicates with an associated PON card 120a, . . . , 120n through respective wavelength division multiplexers 103a, . . . , 103n. Communications between the ODN devices 104a, . . . , 104n and the OLT 102 occur over a downstream wavelength and an upstream wavelength. The downstream communications from the OLT 102 to the ODN devices 104a, . . . , 104n may be provided at 622 megabytes per second, which is shared across all ONTs connected to the ODN devices 104a, . . . , 104n. The upstream communications from the ODN devices 104a, . . . , 104n to the PON cards 120a, . . . , 120n may be provided at, for example, 155 megabytes per second, which is shared among all ONTs connected to ODN devices 104a, . . . , 104n.

An encapsulation procedure, GPON encapsulation method (GEM) may be performed on data packets before they are transmitted in the downstream direction, i.e., from OLT 102 to any of ONTs 106a, 106b, . . . , 106n. For example, GEM logic can be used to encapsulate a data packet (e.g., Ethernet packet) to be transmitted downstream to the PON in a GEM frame.

A broadband source 124, of which a cable television feed through an erbium doped fiber amplifier (EDFA) is just one example, may also provide video or other broadband data to the WDMs 103a, . . . , 103n using a single wavelength (hereinafter, video wavelength). The WDMs 103a, . . . , 103n multiplex the PON upstream and downstream communications wavelengths and the video wavelength and provide the resulting multiplexed signals to respective ODN devices 104a, . . . , 104n. Each ONT (e.g., 106a, 106b, . . . , 106n) may monitor a broadband overlay signal provided by the broadband source 124. One example of a broadband overlay signal is a 1550 nanometer signal used for downstream video applications.

The network elements can be controlled by one or more management systems 126. For example, management system 126 can instruct the network elements to add members or remove members from a group, send configuration files, perform diagnostics on end network elements, and the like. This is done by sending management messages.

Conventional Standards can be implemented to manage communications over a PON network. For example, the ONT Operations, Maintenance, and Control Interface (OMCI) standards as set forth in ITU 983.x and 984.x define protocols for conveying messages over the transport layer within the PON network. An OLT 102, for example, may be configured to transmit OMCI data to the ONTs 106a, 106b, . . . , 106n.

Figure 2:
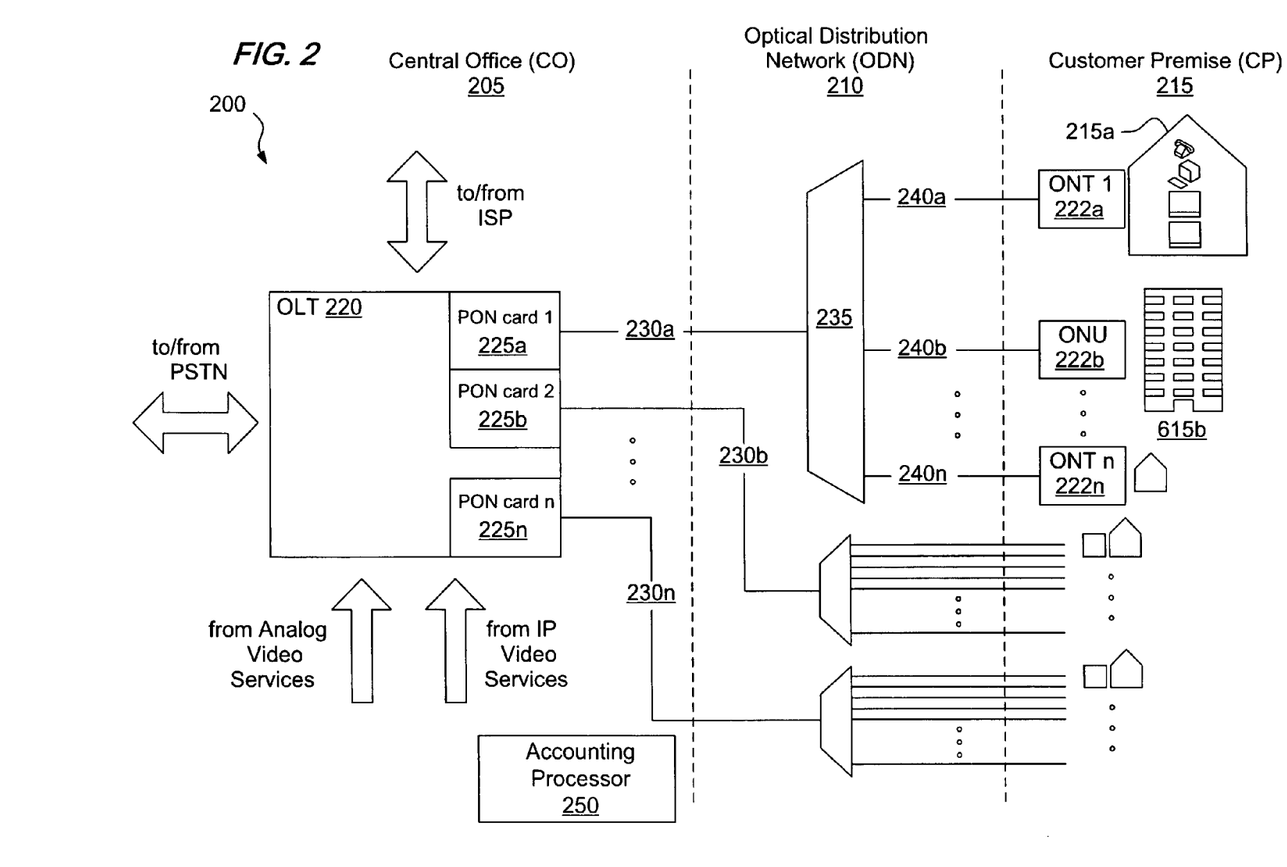
FIG. 2 illustrates an example passive optical network (PON) with a central office (CO), optical distribution network (ODN), and customer premise (CP) in which the example embodiments described below may be employed.

FIG. 2 illustrates an example passive optical network (PON) 200 with a central office (CO) 205, optical distribution network (ODN) 210, and customer premise (CP) 215 in which the example embodiment described herein may be employed.

One embodiment monitors a downstream communications path for a message indicating which video services are available. Another embodiment may maintain a configuration for video services previously provisioned by storing the configuration internally in a PON element.

Continuing to refer to FIG. 2, at the central office 205, an optical line terminal (OLT) 220 is communicatively coupled or otherwise interfaced to, for example, an Internet service provider (ISP) (not shown), a public switched telephone network (PTSN) (not shown), analog video services, and IP video services (not shown). The OLT 220 includes passive optical network (PON) cards 225a . . . 225n.

Services such as data, telephony, and video are provided to customers over shared fibers 230a . . . 230n. At the optical distribution network 210, services provided over the shared fiber 230a . . . 230n are split by a splitter 235 onto two or more distribution fibers 240a . . . 240n.

Communications corresponding to provided services, which are going away from the central office 205 toward the customer premise 215, are hereinafter referred to as downstream communications. Conversely, communications corresponding to provided services, which going away from the customer premise 215 toward the central office 205, are hereinafter referred to as upstream communications.

Services may be deployed in fiber-to-the-home (FTTH), fiber-to-the premise (FTTP), or fiber-to-the-curb (FTTC) architectures. In the case of FTTH, at the customer premise 215, for example a home 215a, services are provided to the customer through an optical network terminal (ONT) 222a. In the case of FTTH, at the customer premise 215, for example an apartment 215b or other multi-dwelling unit (MDU), services are provided to the customers by an optical network unit (ONU) 222b.

While example embodiments are described in reference to an ONT, one skilled the art will readily recognize that the principles described herein apply to both an ONT and an ONU or other termination configured to support embodiments as described herein.

As explained above, a whitelist is a list of accepted items in a set. In the example embodiments described herein, the whitelists are ranges or lists that dictate the Internet Protocol Television (IPTV) channels that a subscriber is capable of accessing. Accessing can be in the form of viewing, listening, or any other application utilizing such whitelists.

A whitelist is applied in an ONT in the context of IPTV scenarios on a given VLAN or on a given address that indicates the normal destination of a packet on the PON (e.g., GEM Port ID). The ONT will ultimately know the VLAN of the channel that contains the IPTV channels and can enable the whitelist operation on all the IGMP join/report messages that ingress the ONT from the subscriber ports. There may also be scenarios where the whitelist is associated with either audio or data services or in-band IPTV switched digital video. A multicast whitelist filter dictates specific multicast groups that a subscriber can join. All other multicast group joins may be discarded.

Generally, the example embodiments described below provide a provisioning scheme that is optimized to support an architecture including potentially millions of ONTs. In addition, these example embodiments improve the efficiency of sending large whitelists to PON components such as ONTs and provide for configuring and maintaining such whitelists with minimal, if any, impact to user services.

Figure 3:
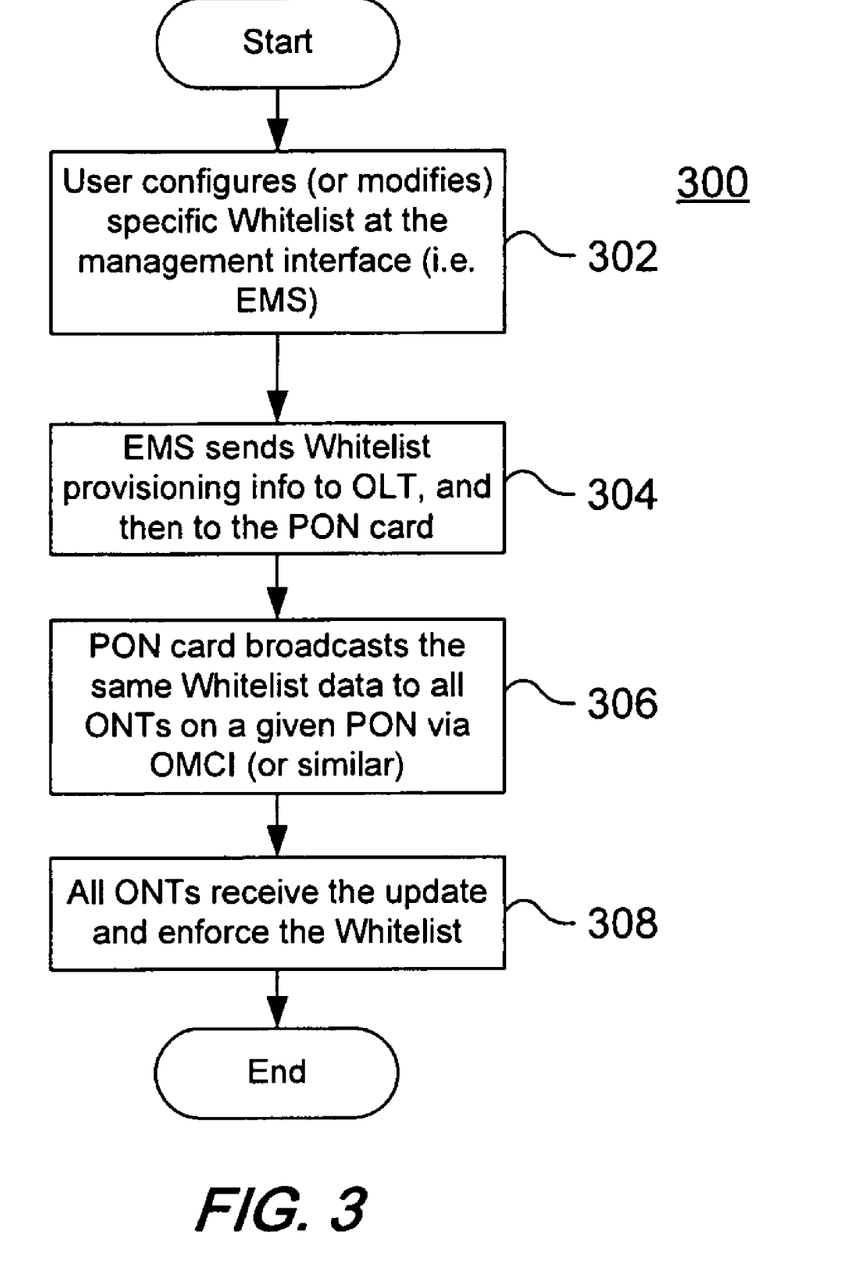
FIG. 3 depicts an example procedure for downloading a single whitelist onto ONTs configured on a given PON.

FIG. 3 depicts a procedure 300 for downloading a single whitelist onto ONTs (e.g., FIG. 1, 106a . . . 106n; FIG. 2, 222a . . . 222n) configured on a given PON (e.g., FIG. 1, 101; FIG. 2, 200). In this approach, all of the ONTs on the PON have access to an identical whitelist and are configured by a PON card (e.g., FIG. 1, 120a . . . 120n; FIG. 2, 225a . . . 225n). The whitelist can be broadcasted to all of the ONTs at a predetermined time, such as periodically, at certain times, before, after or during ranging, or when an ONT is restarted, in which cases all of the ONTs would be refreshed. As described above, a multicast whitelist filter dictates specific multicast groups that a subscriber can join. All other multicast group joins may be discarded.

In block 302, a user provisions (i.e., configures or modifies) a specific whitelist via a management interface ("EMS")(e.g., FIG. 1, 126). The EMS sends the whitelist provisioning information to an OLT, and then to the PON card, as shown in block 304. In block 306, the PON card broadcasts the same whitelist data to all of the ONTs on a given PON using OMCI or similar management protocol. In block 308, all of the ONTs on the PON receive the update and enforce the whitelist.

Figure 4:
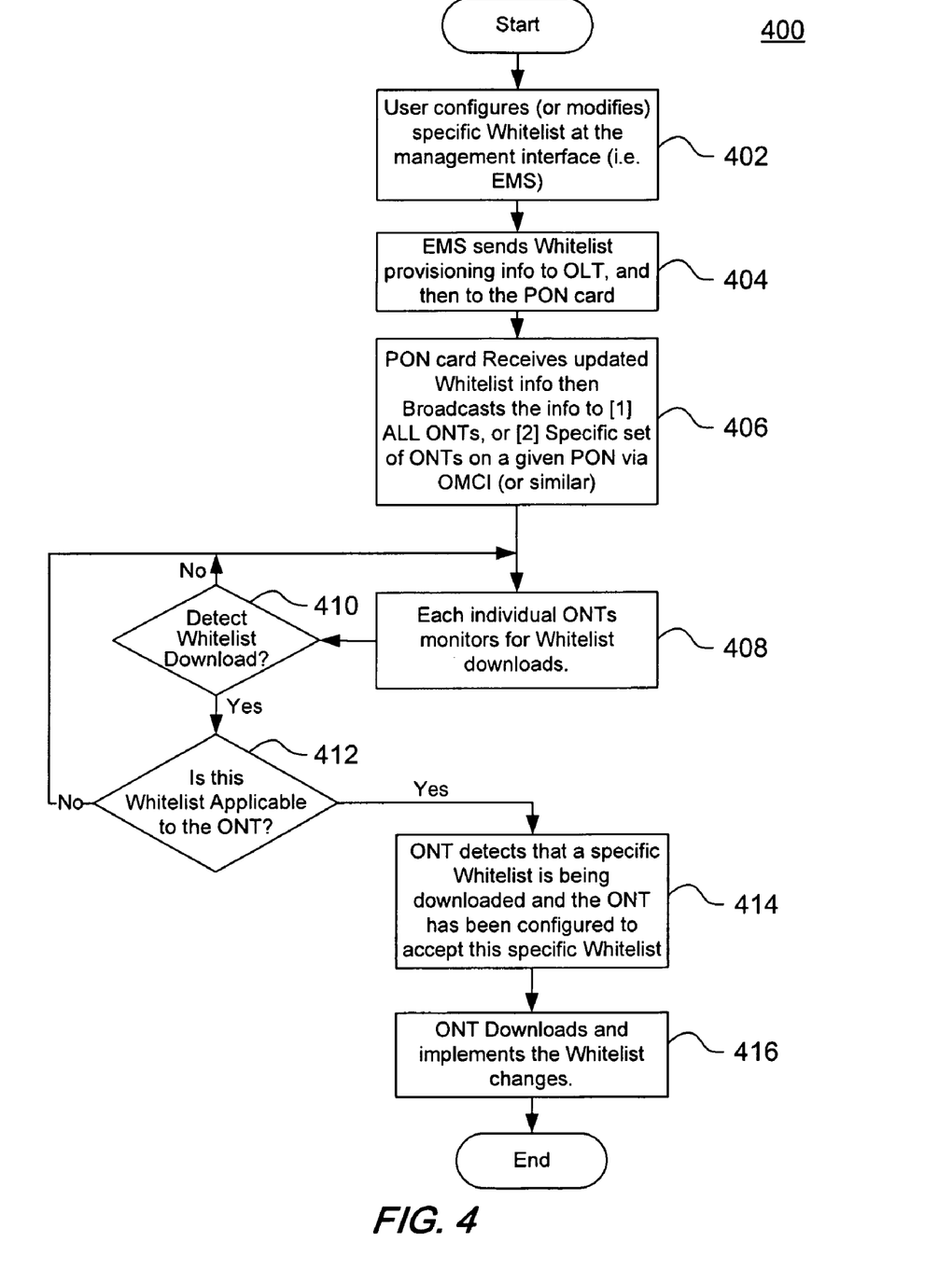
FIG. 4 depicts an example procedure for downloading multiple whitelists onto ONTs configured on a given PON.

FIG. 4 depicts an example procedure 400 for downloading multiple whitelists onto ONTs (e.g., FIG. 1, 106a . . . 106n; FIG. 2, 222a . . . 222n) configured on a given PON in accordance with another example embodiment. In this embodiment, the broadcast mechanism includes multiple broadcast downloads that are based on the service that users have been configured to download. For example, the system may configure up to N different whitelists, and each ONT on a PON can be configured with any one of these N different whitelists. When a PON card (e.g., FIG. 1, 102a . . . 102n; FIG. 2, 225a . . . 225n) first ranges ONTs on the PON, reboots all of the ONTs, or at some other pre-determined time, it can broadcast each of the N different whitelists to all the ONTs using a broadcast protocol. Although the ONTs are capable of receiving (or viewing) all the whitelists downloaded thereto, each ONT can also ignore them or optionally receive a download and store all of the whitelists until it is configured to utilize a specific whitelist profile. In turn, once an ONT is configured, it will either accept a specific broadcast whitelist download or receive a download of all the whitelists and utilize the predetermined whitelist that was assigned to it.

Referring to FIG. 4, in block 402, a user provisions (i.e., configures or modifies) a specific whitelist at the management interface (e.g., FIG. 1, 126). At block 404, the management interface sends the whitelist provisioning information to an OLT (e.g., FIG. 1, 102; FIG. 2, 220), and then to a PON card. The PON card receives updated whitelist information, and broadcasts the information to either all of the ONTs or to a specific set of ONTs on a given PON via an ONT management communication interface ("OMCI"). At block 408, each ONT monitors for whitelist downloads. If a determination is made at block 410 that a whitelist download has been detected, then another determination is made at block 412 whether the detected whitelist is applicable to the particular ONT. If either determination at blocks 410 or 412 is negative, then the procedure continues to monitor for whitelist downloads by looping back to block 408. If, however, a determination is made at block 412 that the detected whitelist is applicable to the ONT, then at block 414 the ONT detects the specific type of whitelist being downloaded and that it has been configured to accept this specific whitelist. In turn, at block 416, the ONT downloads and implements the whitelist changes to control subscriber access (or restrictions) to a corresponding service.

The aforementioned broadcast technique allows a subscriber to sign up to many different IPTV/data/audio packages a-la-carte. Each of the packages can be associated with a specific whitelist. By broadcasting the whitelists, an ONT can easily utilize the specific whitelists(s) that have been provisioned for this user.

The broadcast method of multiple whitelists is made possible by provisioning a path to the ONT and a whitelist identifier (ID). The whitelist ID could, for example, be located at the first part of the broadcast whitelist file. Thus, when a whitelist changes, updates can be made efficiently by simply modifying the whitelist ID. Whitelist changes also can be made during a power up sequence, preferably if the whitelist is not persisted in the ONT.

Security to prevent theft of the whitelists can be implemented, for example, in middleware by the service providers. Such security is implemented to allow customers to select specific channels without making all the channels (e.g., pay-per-view and exclusive packages) viewable and accessible by all ONTs on the PON).

Figure 5:
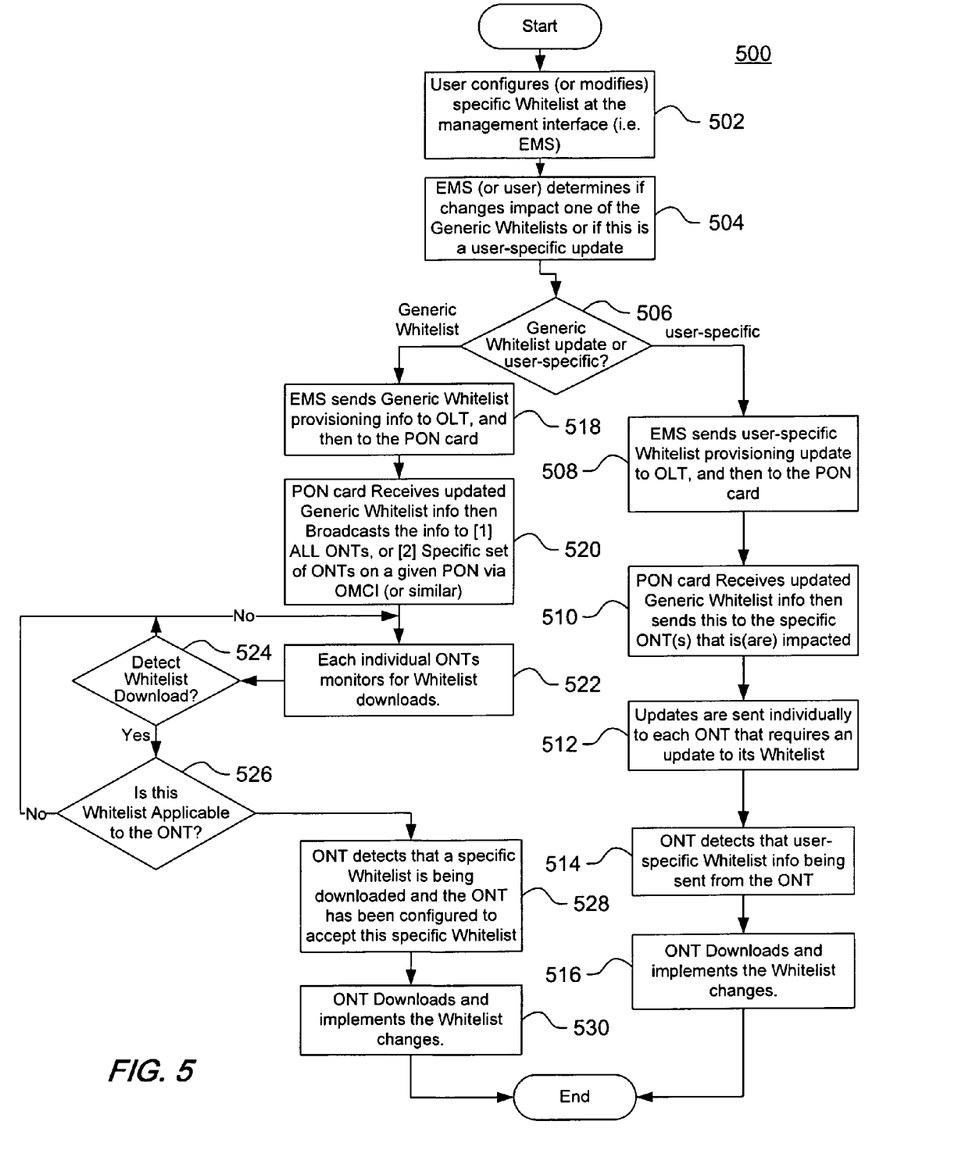
FIG. 5 depicts an example procedure 500 for downloading a single whitelist onto ONTs configured on a given PON.

FIG. 5 depicts a procedure 500 for downloading a single whitelist onto ONTs (e.g., FIG. 1, 106a . . . 106n; FIG. 2, 222a . . . 222n) configured on a given PON. Generally, in addition to the aforementioned broadcast procedure, this procedure also includes unicast features that take advantage of the encryption utilized on particular ONT channels as opposed to only using the broadcast channels discussed above with respect to FIGS. 3 and 4. In this hybrid approach, a service provider may provide a predetermined generic list of channels available to all ONTs on the PON. A whitelist containing such a list of accepted items is referred to herein as a generic whitelist. A generic whitelist can be used, for example, to provide either a basic feature set (sometimes referred to as "Basic Cable") or a slightly larger feature set of channels that are often subscribed to by end-users. This example embodiment enhances the mechanism by adding an extra per-ONT flow for ONT-specific whitelist provisioning.

This hybrid approach is accomplished by using a unicast channel that is either on the ONT's existing OAM channel, also referred to as the ONT management communication interface ("OMCI") channel, or a similar provisioning channel that has general access to ONT FCAPS ("fault-management, configuration, accounting, performance, and security"). In this example, the bulk of whitelist provisioning is available to all ONTs and only a fraction of whitelist channels would be configured via the OMCI channel (or other alternate management channels such as TR-069 or other proprietary channel).

Referring to FIG. 5, at block 502, a user provisions (i.e., configures or modifies) a specific whitelist at a management interface ("EMS") (e.g., FIG. 1, 126). In block 504, the management interface (or user) determines if changes (e.g., to a video, voice and/or data service) impact one of the generic whitelists or if this is a user-specific update. If at block 506 a determination is made that the update is a user-specific change, then at block 508, the management interface sends a user-specific whitelist provisioning update to an OLT (e.g., FIG. 1, 102; FIG. 2, 220), and then to the corresponding PON card (FIG. 1, 102a . . . 102n; FIG. 2, 225a . . . 225n).

At block 510, the PON card receives information associated with an updated generic whitelist and then sends this information to one or more specific ONTs that are impacted. In turn, updates are sent individually to each ONT that requires an update to its whitelist, as shown in block 512. At block 514 the ONT detects that the user-specific whitelist information is being received and at block 516 the ONT downloads and implements the whitelist changes to control subscriber access (or restrictions) to a corresponding service.

Referring back to block 506, if the whitelist is a generic whitelist update, then at block 518, the EMS sends the generic whitelist provisioning information to an OLT, and then to one or more associated PON cards. In turn, at block 520, each PON card receives information associated with the updated generic whitelist and broadcasts the information to all ONTs or to a specified set of ONTs on a given PON via OMCI (or similar type management potential).

At block 522, each ONT monitors for whitelist downloads. If a determination is made at block 524 that a whitelist download has been detected, then another determination is made at block 526 whether the detected whitelist is applicable to the particular ONT. If either determination at block 524 or 526 is negative, then the procedure continues to monitor for whitelist downloads by looping to block 522. If however, a determination is made at block 526 that the detected whitelist is applicable to the ONT, then at block 528 the ONT detects the specific type of whitelist being downloaded and that it has been configured to accept this specific whitelist. In turn, at block 530, the ONT downloads and implements the whitelist changes to control subscriber access (or restrictions) to a corresponding service.

Figure 6:
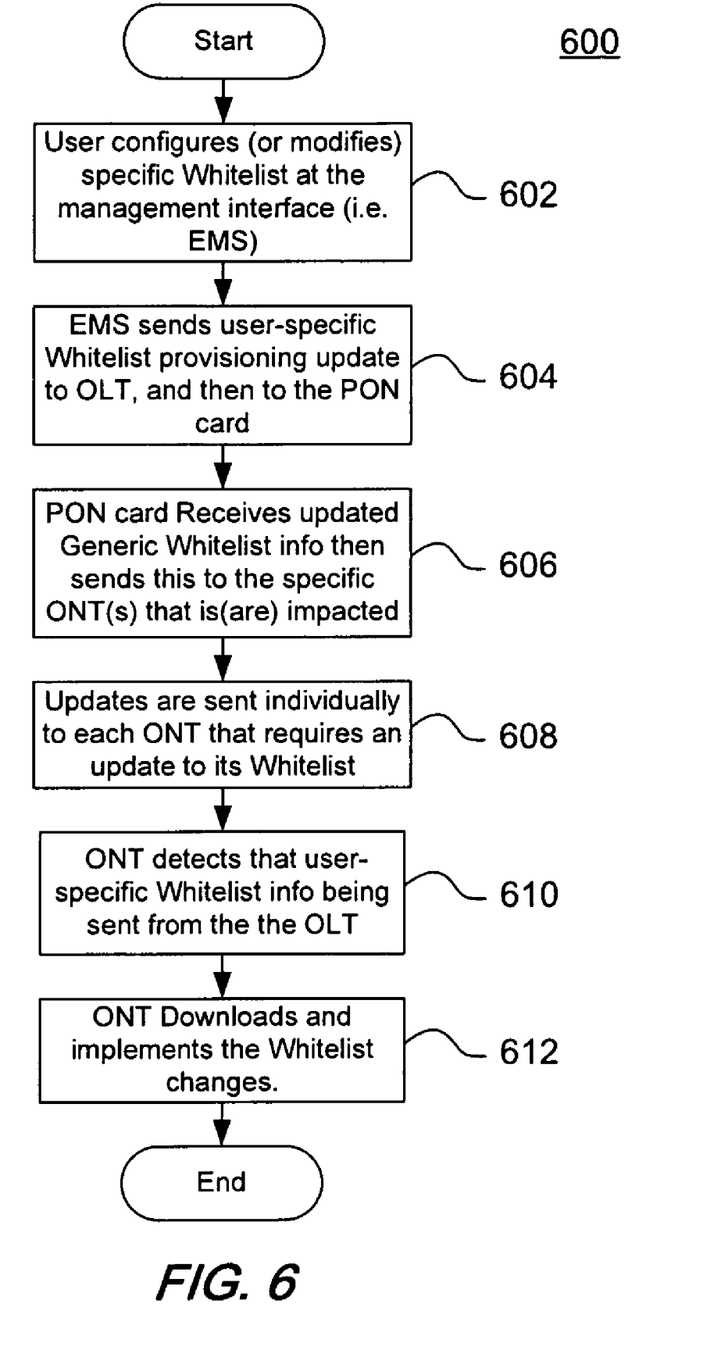
FIG. 6 depicts a procedure 600 for performing individual unicast whitelist downloads on a per-ONT basis.

FIG. 6 depicts a procedure 600 for performing individual unicast whitelist downloads on a per-ONT basis. In this scenario, a PON card (FIG. 1, 102*a* . . . 102*n*; FIG. 2, 225*a* . . . 225*n*) sends whitelists individually to each ONT (e.g., FIG. 1, 106*a* . . . 106*n*; FIG. 2, 222*a* . . . 222*n*). As each ONT is ranged, it receives its corresponding whitelist for end-user IPTV (and/or audio/data) services. This mechanism can take advantage of existing communication interfaces between ONTs such as the OMCI channel, is secure, and is flexible on a per-ONT basis. After an initial whitelist download, the whitelists are continuously updated and maintained on ONTs. Once lists have been configured, they do not need to be re-programmed each time the OLT looses communications with the ONTs. Instead, ONTs take advantage of OMCI MIB-synchronization features to avoid unnecessary downloads in a similar fashion that it does for regular ONT provisioning attributes.

Referring to FIG. 6, in block 602, a user provisions (i.e., configures or modifies) a specific whitelist at the management interface ("EMS") (e.g., FIG. 1, 126). At block 604, the EMS sends a user-specific whitelist provisioning update to an OLT, and then to a PON card. The PON card receives the updated generic whitelist information and forwards this information to the specific ONT(s) that are impacted, as shown in block 606. In block 608, updates are sent individually to each ONT that requires an update to its whitelist. An ONT detects that user-specific whitelist information is being sent from the OLT, as shown in block 610, and then downloads and implements the whitelist changes to control subscriber access (or restrictions) to a corresponding service, as shown in block 612.

In another example embodiment, whitelist updates occur from a single location. Particularly, updates come from a single OLT (e.g., FIG. 1, 102; FIG. 2, 220) to multiple PON card interfaces. This example embodiment provides a central location in the OLT that broadcasts or sends unicast whitelist updates to its associated PON cards. The PON cards then forward the appropriate information onto their PONs toward all subtended ONTs per the different scenarios described above with respect to FIGS. 3-6. Thus, a PON card can contain all of the whitelists that are available for the system but only propagates the whitelists that are being used by its respective ONTs.

Once whitelists have been downloaded onto ONTs or after certain conditions occur on the EMS (e.g., FIG. 1, 126), PON card or within the ONT itself, the whitelists are maintained. Different levels of whitelist maintenance will now be described.

EMS provisioning updates occur when a user changes the whitelist profiles at the management system. The different maintenance options depend on how the whitelists were provisioned. For example, with respect to the whitelist provisioning described with respect to FIG. 3 (i.e., where all ONTs on a PON have access to the identical whitelist), if any channels are added or deleted to the line-up, all the ONTs will have their lists updated by the system.

In the scenario described above with respect to FIG. 4, (i.e., where the broadcast mechanism includes multiple broadcast downloads that are based on the service that users have been configured to download), if any channels associated with specific whitelist profiles are added or deleted, all ONTs have access to the updates, but only the ONTs that have been configured to utilize the "updated" whitelist will implement those changes on subscriber channel-change requests.

In the scenario described above with respect to FIG. 5 (i.e., broadcast/unicast approach) two options exists. Where the service provider has a predetermined generic list of channels available to all ONTs on the PON, if the channel(s) added or removed impact the entire generic line-up, then the broadcast line-up will be affected and all ONTs on the PON will receive and implement the update. If the channel(s) added or removed impact a specific ONT, then only that ONT shall receive the updated whitelist via its unicast provisioning channel.

Alternatively, where the PON card sends entire whitelists individually to each ONT, if the channels added/removed impact a common whitelist profile that impacts all ONTs, then all ONTs will individually be notified via their unicast channels of the updates. If the channel(s) added or removed impact a specific ONT, then only that ONT shall receive the updated whitelist via its unicast provisioning channel, as described above for example with respect to FIG. 6.

ONT whitelist generic maintenance will now be described. Once a whitelist is downloaded to an ONT, it is desired to minimize any impacts to the whitelist. Accordingly, in one example embodiment, this whitelist can be maintained across reboots by storing it in non-volatile memory so that it is available after the ONT reboots. This allows the ONT to offer video services as soon as possible without requiring a provisioning update from the OLT.

During a loss of signal ("LOS") condition, the ONT and the OLT can maintain a standards-based OMCI MIB-sync described in the ITU-T standards G.983.X or G.984.X OMCI, according to an example embodiment, to ensure that the values in this whitelist are synchronized with the values known to the OLT.

Figure 7:
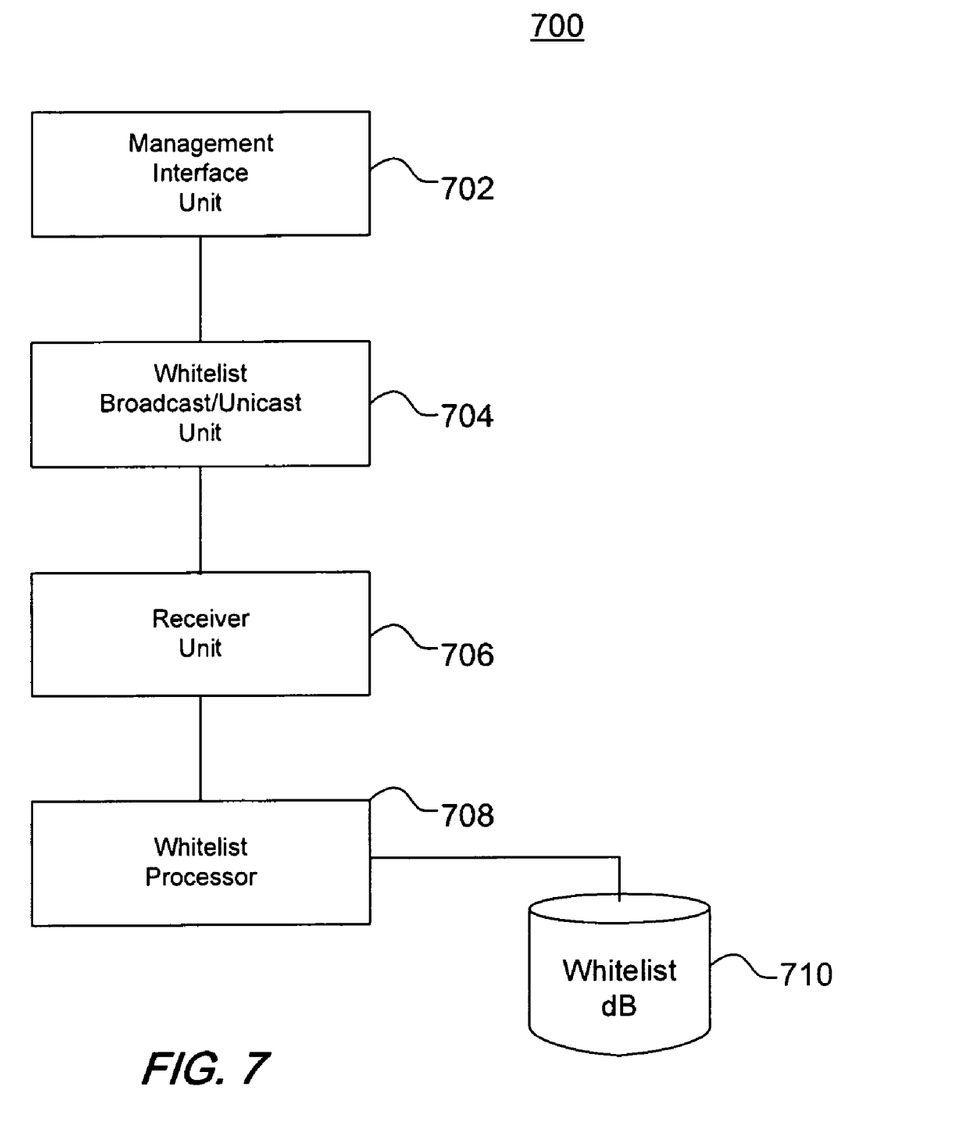
FIG. 7 is an example collaboration diagram of functional modules deployed on a computer system for generating and maintaining whitelists, as well as broadcasting/unicasting the whitelists to PON elements.

FIG. 7 is a collaboration diagram of functional modules 700 deployed on a computer system for generating and maintaining whitelists, as well as broadcasting/unicasting the whitelists to subtended PON elements. A management interface unit 702 provides an interface for a user to configure or modify a whitelist. The whitelists can be directed to a specific user (e.g., on a per ONT-basis) or generic for multiple ONTs. Depending on the procedure described above with respect to FIGS. 3-6, whitelist broadcast/unicast unit 704 transmits the whitelists onto the PON (e.g., 101). As described above, the starting point may be, for example, a PON card on an optical line terminal. Receiver unit 706 receives the whitelist and whitelist processor 708 processes the whitelist to determine, for example, whether a whitelist has been detected and whether the whitelist is applicable to a particular ONT (or other PON device). The whitelist may also be stored on a whitelist database 710 (e.g., MIB database).

In another example embodiment, both the exchange of revenue between a service provider who owns the access network (i.e., the OLT, FIG. 1, 102; FIG. 2, 220, and the ONTs, FIG. 1, 106*a* . . . 106*n*; FIG. 2, 222*a* . . . 222*n*) and a content provider who provides access to specific channels that would be bundled and sent over this access network via the whitelists, are accounted for by an accounting processor (FIG. 2, 250). The accounting processor (FIG. 2, 250) can be located, for example, in the central office 205 to monitor the whitelist. The revenue exchange could cover the case where channels from the content provider are associated with one or more bundle of channels/whitelists, which are transmitted to customers as described above with respect to FIGS. 1-7.

In yet another example embodiment, the revenue exchange between end-user subscribers and the service provider is accounted for by an accounting processor (FIG. 2, 250), particularly, the revenue exchanged to have access packaged whitelists. The revenue from the subscriber can be distributed among the service provider and the content provider(s).

The example embodiments (i.e., systems 100, 200, procedures 300-600, computational modules in diagram 700, or any part(s) or function(s) thereof) may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, typically one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage are utilized. From a software standpoint, a typically software resident on a storage media (e.g., a disk drive or memory card), which, when executed, directs the CPU 103 in performing transmission and reception functions is utilized. The software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, processors can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

In other example embodiments the processor may include plural separate processors, wherein each is dedicated to a separate application, such as, for example, a data application, a voice application, and a video application.

Software embodiments of the example embodiments presented herein may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-7 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for downloading a whitelist onto a passive optical network, comprising:
   a management interface communicatively coupled to the passive optical network, configured to provision the whitelist; and
   an optical line terminal on the passive optical network having a passive optical network card operable to broadcast the whitelist to a plurality of optical network terminals, each optical network terminal configured to receive and enforce the whitelist,
   wherein the management interface is operable to update the whitelist with a user-specific update, and the optical line terminal is configured to provision a path to the optical network terminal and a whitelist identifier, and wherein the optical network terminal is further configured to determine, based on the whitelist identifier, if the whitelist is applicable to the optical network terminal.

2. The system according to claim 1, further comprising:
   a multicast filter operable to filter a multicast group.

3. The system according to claim 1, wherein each optical network terminal is further configured to receive and enforce a plurality of whitelists, each whitelist corresponding to a different service subscription.

4. The system according to claim 1, wherein the whitelist is broadcasted at a predetermined time.

5. The system according to claim 1, further comprising:
   an accounting processor configured to compute an accounting of revenue exchange between a service provider and a content provider providing access to predetermined channels communicated over an access network and associated with the whitelist.

6. A system according to claim 1, further comprising:
   an accounting processor configured to compute an accounting of revenue exchange between a plurality of end-user subscribers and a service provider, and associated with access to the whitelist.

7. The system according to claim 1, wherein the whitelist includes the whitelist identifier.

8. A method for downloading a whitelist onto a passive optical network, comprising:
provisioning the whitelist; and
broadcasting the whitelist to a plurality of optical network terminals, each optical network terminal configured to receive and enforce the whitelist,
updating the whitelist with a user-specific update;
provisioning a path to the optical network terminal and a whitelist identifier; and
determining, based on the whitelist identifier, if the whitelist is applicable to the optical network terminal.

9. The method according to claim 8, further comprising:
filtering a multicast group.

10. The method according to claim 8, further comprising:
receiving and enforcing a plurality of whitelists, each whitelist corresponding to a different service subscription.

11. The method according to claim 8, wherein the whitelist is broadcasted at a predetermined time.

12. The method according to claim 8, further comprising:
computing an accounting of revenue exchange between a service provider and a content provider providing access to predetermined channels communicated over an access network and associated with the whitelist.

13. The method according to claim 8, further comprising:
computing an accounting of revenue exchange between a plurality of end-user subscribers and a service provider, and associated with access to the whitelist.

14. The method according to claim 8, wherein the whitelist includes the whitelist identifier.

15. A computer-readable medium having stored thereon sequences of instructions, the sequences of instructions including instructions which when executed by a computer system causes the computer system to perform:
provisioning a whitelist; and
broadcasting the whitelist to a plurality of optical network terminals, each optical network terminal configured to receive and enforce the whitelist;
updating the whitelist with a user-specific update;
provisioning a path to an optical network terminal and a whitelist identifier; and
determining, based on the whitelist identifier, if the whitelist is applicable to the optical network terminal.

16. The computer-readable medium according to claim 15, wherein the instructions also cause the computer system to perform:
filtering a multicast group.

17. The computer-readable medium according to claim 15, wherein the instructions also cause the computer system to perform:
receiving and enforcing a plurality of whitelists, each whitelist corresponding to a different service subscriptions.

18. The computer-readable medium according claim 15, wherein the whitelist is broadcasted at a predetermined time.

19. The computer-readable medium according to claim 15, wherein the instructions also cause the computer system to perform:
computing an accounting of revenue exchange between a service provider and a content provider providing access to predetermined channels communicated over an access network and associated with the whitelist.

20. The computer-readable medium according to claim 15, wherein the instructions also cause the computer system to perform:
computing an accounting of revenue exchange between a plurality of end-user subscribers and a service provider, and associated with access to the whitelist.

* * * * *

UNITED STATES PATENT AND TRADEMARK OFFICE
CERTIFICATE OF CORRECTION

| | |
|---|---|
| PATENT NO. | : 8,023,820 B2 |
| APPLICATION NO. | : 12/013797 |
| DATED | : September 20, 2011 |
| INVENTOR(S) | : Marc R. Bernard et al. |

It is certified that error appears in the above-identified patent and that said Letters Patent is hereby corrected as shown below:

COLUMN 1:

Line 23, "chose" should read --chosen--.

COLUMN 4:

Line 10, "which going away" should read --which are going away--;
Line 14, "fiber-to-the premise" should read --fiber-to-the-premise--; and
Line 23, "skilled the" should read --skilled in the--.

COLUMN 7:

Line 19, "looses" should read --loses--.

COLUMN 8:

Line 4, "exists." should read --exist.--;
Line 44, "a optical" should read --an optical--; and
Line 62, "bundle" should read --bundles--.

COLUMN 9:

Line 25, "a typically" should read --typically a--;
Line 26, "media" should read --medium--; and
Line 29, "media," should read --medium,--.

COLUMN 12:

Line 20, "tions." should read --tion.--.

Signed and Sealed this
Sixth Day of December, 2011

David J. Kappos
*Director of the United States Patent and Trademark Office*